United States Patent Office 3,437,604
Patented Apr. 8, 1969

3,437,604
HYDROCARBON CONVERSION CATALYST PREPARATION
Edward Michalko, Chicago, Ill., assignor to Universal Oil Products Company, Des Plaines, Ill., a corporation of Delaware
No Drawing. Filed July 5, 1966, Ser. No. 562,503
Int. Cl. B01j 11/40, 11/46; C10g 11/04
U.S. Cl. 252—455                    6 Claims

ABSTRACT OF THE DISCLOSURE

A catalyst is prepared by dispersing a finely divided alkali metal form of a faujasite in aqueous media and forming a slurry thereof, admixing said slurry with an acidic silica hydrosol at a pH of from about 4.0 to about 4.5 and effecting gelation, adjusting the pH of the resulting slurry to a pH of from about 5 to about 8 and aging the slurry, treating the resulting hydrogel product with an ammonium salt solution and effecting substantially complete removal of the alkali metal content of said hydrogel product, followed by washing the substantially alkali metal-free product free of soluble matter and drying the resultant catalyst composite. The catalyst thus prepared is useful in the catalytic cracking of hydrocarbon oils.

---

This invention relates to a method of preparing improved catalysts particularly suitable for effecting the cracking of hydrocarbon feed stocks. The invention further relates to a process for the conversion of hydrocarbon feed stocks in contact with catalytic materials prepared in accordance with the method of the present invention.

For many years petroleum hydrocarbon feed stocks boiling in the range above about 400° F. have been converted to lower boiling hydrocarbons in the motor fuel boiling range by heating them at a temperature of from about 600° F. to about 1100° F. in contact with an amorphous silica-alumina cracking catalyst. While other similar composites, e.g., silica-zirconia, silica-magnesia etc., have been known to catalyze said cracking, a silica-alumina composite has been by far the most widely accepted catalyst in the industry. More recently, improved catalysts have been prepared by the inclusion of a finely divided zeolite, or crystalline alumino-silicate, either naturally occurring or synthetically prepared, within the silica-alumina matrix. Prior inventors have prepared, tested and compared hydrocarbon conversion catalysts comprising a finely divided crystalline alumino-silicate distributed throughout an amorphous silica matrix on the one hand, and throughout an amorphous silica-alumina matrix on the other hand. The general conclusion has been that the amorphous silica-alumina matrix affords a superior cracking catalyst. It has been discovered that the amorphous silica matrix is in fact superior to the amorphous silica-alumina matrix in this respect provided that the catalyst is prepared in the manner hereinafter described. It has been found that the amorphous silica matrix affords a superior catalyst than is attainable with an amorphous silica-alumina matrix whether the catalyst comprising the amorphous silica-alumina matrix is prepared by the method of this invention or by prior art methods. That this is totally unexpected in the art is evidenced by the fact that in spite of the comparatively low cost of silica the industry has turned almost exclusively to silica-alumina. Thus, by the method of this invention, a cracking catalyst is manufactured at a considerable reduction in cost, said catalyst resulting in higher hydrocarbon conversions in the catalytic cracking process and lower coke yields to effect a more economical hydrocarbon conversion process.

In one of its board aspects, the present invention embodies a method of preparing a hydrocarbon conversion catalyst which comprises (a) dispersing a finely divided alkali metal form of faujasite in aqueous media and forming the mixture into a homogenized slurry, (b) admixing said slurry with an acidic silica hydrosol at a pH of from about 4.0 to about 4.5 and effecting gelation at a temperature of from about 70° F. to about 110° F., (c) adjusting the pH of the resulting slurry to a pH of from about 5 to about 8 and aging the slurry for a period of from about 0.5 to about 3 hours, (d) treating the resulting hydrogel product with an ammonium salt solution and effecting substantially complete removal of the alkali metal content of said hydrogel product, and (e) washing the substantially alkali metal-free product free of soluble matter and drying the resultant catalyst composite.

In accordance with the method of this invention a finely divided alkali metal faujasite is initially dispersed in aqueous media and formed into a homogenized slurry. The alkali metal faujasite, usually the sodium form, utilized pursuant to the method of the present invention can be a naturally occurring faujasite. However, as a practical matter, a synthetically prepared faujasite is preferred. The faujasites herein contemplated have been defined in the literature and do not warrant an extensive description here. Briefly, the faujasite is a zeolite, or crystalline alumino-silicate, of three dimensional structure, the crystalline form being often described as a truncated octahedra with pore openings in the range of from about 6 to about 15 angstroms. The faujasites can be represented in terms of mole ratios of oxides in the following manner:

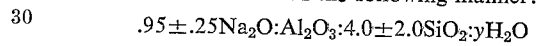
$.95\pm.25Na_2O:Al_2O_3:4.0\pm2.0SiO_2:yH_2O$ wherein $y$ is a number up to about 8. It is preferred to utilize a faujasite characterized by a silica-alumina ratio of at least about 3, for example, a faujasite represented in terms of mole ratios of oxides as follows:

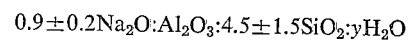
$0.9\pm0.2Na_2O:Al_2O_3:4.5\pm1.5SiO_2:yH_2O$

The synthetic crystalline alumino-silicates are commercially available or may be prepared in any conventional or otherwise convenient manner. For example, one preferred method comprises forming an aqueous solution of sodium aluminate and sodium hydroxide and adding thereto an aqueous sodium silicate solution. The resulting reaction mixture preferably comprises a molar ratio of $Na_2O$ to $SiO_2$ of at least about 0.4/1 and generally not in excess of about 2/1. Sodium aluminate with a molar ratio of $Na_2O$ to $Al_2O_3$ of about 1.5/1 is suitably employed. The amounts of sodium silicate solution and the sodium aluminate solution are such that the mole ratio of silica to alumina in the final mixture is preferably at least 3/1. Preferably, the reaction mixture has a composition expressed as a mixture of oxides as follows: $SiO_2$ to $Al_2O_3$ in a ratio of about 6/20, $Na_2O$ to $SiO_2$ in a ratio of about 0.6 to 1.5 and $H_2O$ to $Na_2O$ in a ratio of about 35 to 60. In any case the reaction mixture is heated, usually at a temperature of about 212° F., in a closed vessel to avoid water loss. The crystalline alumino-silicate reaction product which precipitates from the hot reaction mixture is separated and water washed until the water in equilibrium with the crystals attains a pH of from about 9 to about 12.

The finely divided faujasite dispersed in aqueous media is thoroughly homogenized before admixing the same with an acidic silica hydrosol in the manner hereinafter described. The faujasite is suitably homogenized in water in a concentration and to the extent that there is essentially no settling of the faujasite for a period of at least about 10 minutes subsequent to the homogenizing process. While the concentration of the faujasite in the aqueous media is not considered critical, a faujasite/water weight ratio of about 1/5 has produced a suitable homogenized slurry upon thorough and adequate mixing.

The finely divided faujasite thus homogenized is admixed with an acidic silica hydrosol in an amount to insure a final catalyst composite comprising from about 1.0 to about 50 weight percent faujasite dispersed in the amorphous silica matrix, preferably from about 1.0 to about 10 weight percent. In the practice of this invention, the homogenized faujasite slurry is admixed with an acidic silica hydrosol at a pH of from about 4.0 to about 4.5. The acidic silica hydrosol is obtainable by conventional methods of preparation including acidification of sodium silicate with a mineral acid, such as sulfuric or hydrochloric acid. The homogenized faujasite may be admixed with the acidic silica hydrosol in a manner whereby said faujasite is initially added to, for example, a sodium silicate solution and the resulting mixture acidified with sulfuric acid to establish the desired pH value of from about 4.0 to about 4.5. A preferred method comprises acidifying an aqueous sodium silicate solution with an aqueous sulfuric acid solution of a concentration sufficient to establish the desired pH of from about 4.0 to about 4.5, or, more preferably, a pH of from 4.2 to about 4.4, and thereafter admixing the faujasite slurry with the acidic silica hydrosol at a temperature of from about 70° F. to about 110° F., preferably at a temperature of from about 90° F. to about 100° F. A preferred method of establishing the desired temperature comprises initially adjusting the temperature of the aforementioned sodium silicate solution so that upon admixing the sulfuric acid solution therewith, the resulting acidified silica hydrosol temperature is in the desired range. Since gelation of the acidic silica hydrosol occurs within a matter of minutes, usually within from about 10 to about 15 minutes, at the described conditions, the faujasite should be admixed with the hydrosol without undue delay.

After a suitable period of time has elapsed during which the slurry is permitted to age at the acidic conditions, preferably under conditions of rapid and continuous stirring, whereby the silica is polymerized to a complex polysilicic acid, the slurry is adjusted to a pH of from about 5 to about 8, preferably a pH of from about 6 to about 7. The slurry is thereafter aged for a time sufficient to develop optimum pore structure of the silica hydrogel, a period of from about 0.5 to about 3 hours being suitable, a period of from about 0.5 to about 1.5 hours being preferred.

The aged hydrogel recovered from the slurry is thereafter treated with an ammonium salt solution for the separation of substantially all of the alkali metal ions so that the final catalyst composite comprises less than about 0.1 weight percent alkali metal. One convenient and preferred method comprises recovering the hydrogel as a filter cake. The filter cake is then reslurried or mixed with water to a smooth consistency and subjected to spray drying whereby the aqueous slurry is sprayed in an atomized state into an atmosphere of hot inert gases to effect a rapid evaporation of moisture so that dried particles of a predetermined size range fall out of the spray. If so desired, the aforesaid filter cake can be water-washed to concentrate and partially remove soluble salts prior to the spray drying process. Alternatively, the spray dried material can be reslurried and subjected to one or more water-washings to reduce the soluble content to an acceptable level. In any case, the aged hydrogel separated from the aforesaid slurry is treated with an ammonium salt solution to remove substantially all of the sodium or other alkali metal ions, and this last mentioned step may be combined with either or both of the aforementioned water-washing steps or may be separate and apart therefrom.

In one preferred embodiment, the composite, substantially free of alkali metal, is further treated in contact with a solution, preferably an aqueous solution, comprising both rare earth cations and ions selected from the group consisting of hydrogen ions, hydrogen ion precursors, and mixtures thereof. The ratio of hydrogen ions, or ions capable of conversion to hydrogen ions, to rare metal ions is not considered critical and may vary over a relatively wide range. A particularly suitable solution is one containing rare earth metal ions and hydrogen ions, or ions capable of conversion to hydrogen ions, in a ratio of from about 10/1 to about 1/1 whereby a base-exchange reaction is effected to yield a composite which comprises aluminum and rare earth metals in a ratio of from about 3/1 to about 6/1. Organic and inorganic acids are generally considered as a convenient source of hydrogen ions. However, it is preferred to utilize a hydrogen ion precursor, particularly an ammonium salt such as ammonium chloride, which is decomposable to provide hydrogen ions at a temperature below the decomposition temperature of the faujasite. Other suitable ammonium salts include ammonium bromide, ammonium iodide, ammonium carbonate, ammonium bicarbonate, ammonium sulfate, ammonium sulfide, ammonium isocyanate, ammonium hydroxide, ammonium molybdate, ammonium benzoate, ammonium borate, ammonium citrate, etc.

The rare earth metals include cerium, lanthanum, praseodymium, neodymium, illinium, samarium, europium, gadolinium, terbium, dysprosium, holmium, erbium, thulium, scandium, yttrium, and lutecium. A wide variety of rare earth compounds can be employed with facility as a source of rare earth metal ions. Suitable compounds include rare earth chlorides, bromides, iodides, carbonates, bicarbonates, sulfates, sulfides, biocyanates, peroxy sulfates, acetates, benzoates, citrates, fluorides, nitrates, formates, proprionates, butyrates, valerates, lactates, malanates, oxylates, palmatates, hydroxides, tartrates, and the like. The preferred rare earth salts are the chlorides, nitrates and sulfates. The rare earth metal salts employed can either be the salt of a single rare earth metal or, as is usually the case, mixtures of rare earth metals such as rare earth metal chlorides of didymium chlorides. It is contemplated that the product thus treated comprises rare earth cations chemisorbed or ionically bonded to the faujasite, although it may vary well be that at least a portion of said cations may be so sorbed or bonded to the amorphous silica component of the catalyst composite.

Anions introduced to the composite as a consequence of the base-exchange treatment are suitably separated by water-washing one or more times until free of said anions. The composite is thereafter dried, generally in an air atmosphere, at an elevated temperature, a temperature of from about 150° F. to about 600° F. being suitable.

Catalysts prepared in accordance with the method of this invention are particularly effective in the cracking of hydrocarbon feed stocks, such as occur in the gas-oil range of petroleum hydrocarbons, to form lower boiling hydrocarbons in the motor fuel range. Catalytic cracking conditions generally described in the art apply. In particular, a temperature of from about 700° F. to about 1200° F. may be employed and the pressure may range from subatmospheric to several atmospheres. The cracking process can be effected by any of the well-known techniques including a fixed bed type of operation, a moving bed type of operation and, in particular, the well-known fluidized bed type of operation.

The following examples are presented in illustration of the method and advantages of this invention and are not intended as an undue limitation on the generally broad scope of the invention as set out in the appended claims.

Example I

In the preparation of the faujasite to be included in an amorphous silica matrix as herein contemplated, 780 grams of sodium aluminate, containing 23.3 weight percent sodium and 44.6 weight percent $Al_2O_3$, and 1,994 grams of sodium hydroxide pellets were dissolved in 9,520 milliliters of distilled water. This solution was allowed to cool with stirring and then added to 9,500 milliliters of an aqueous colloidal silica sol containing 35 weight percent $SiO_2$. The resultant mixture was aged without stirring over a period of about 20 hours. The reaction vessel was then sealed and heated at 203° F. for a 48 hour period to effect crystallization of the faujasite product. Thereafter, the mother liquor was decanted from the crystalline product which was then washed with distilled water until the pH of the wash effluent was about 10.5. The product was dried at about 250° F. Chemical analysis indicated a product composition as follows:

|   | Percent |
|---|---|
| Volatile @ 932° F. | 24.7 |
| $Al_2O_3$ | 22.51 |
| $SiO_2$ | 64.35 |
| $Na_2O$ | 12.5 | giving a high silica faujasite with a silica/alumina ratio of 4.86. Physical analysis indicated a surface area of 727 square meters per gram, a pore volume of 0.36 milliliter per gram and an average pore diameter of 20 angstroms. The faujasite product was utilized in the present Example I and in the subsequent Example II.

A portion of the faujasite thus prepared was incorporated in an amorphous silica matrix to the extent of 10 weight percent in the following manner. An acidic silica hydrosol was prepared initially by the addition of 27,330 milliliters of water glass (sodium silicate) solution, containing 6.9 weight percent $SiO_2$, to 3,340 milliliters of 25% sulfuric acid, the final pH being 4.4 at 100° F. To the resulting acidified silica hydrosol was added a homogenized faujasite prepared by the addition of 294 grams of dried faujasite including water of crystallization to one liter of water and homogenized by treatment in a blending apparatus for a period of about one minute. The pH of the resultant slurry was 4.8. Gelation occurred within about 5 minutes with stirring being continued for an additional 10 minutes. The pH was then adjusted to 6.6 by the addition of 59 milliliters of 15% aqueous ammonia solution. After one hour of aging at said pH the solids were separated from the supernatant liquid, reslurried with about 25 liters of water and spray dried. The spray dried product was then washed 6 times, each with a 1500 milliliter solution containing 50 grams of ammonium chloride. Washing was accomplished at about 70° F. The product was further water-washed free of chloride ions. The washed product was thereafter soaked in a base-exchange solution comprising 8.5 grams of ammonium chloride and 43.0 milliliters of a mixed rare earth chloride solution (57.92% rare earth chloride hexahydrate) in 1,240 milliliters of water. Soaking was accomplished over a 2 hour period with occasional stirring at room temperature. The base-exchanged product was then recovered, water-washed free of chloride, air dried at 350° F. and calcined at 1112° F. The catalyst thus prepared was steam deactivated in preparation for testing as hereinafter described by passing 60% steam in air in contact with the catalyst at a temperature of 1400° F. for a period of 12 hours. The steam deactivated catalyst had an average bulk density of 0.50 and contained 1.54% rare earth metals. The catalyst is hereinafter referred to as Catalyst A.

Example II

Catalyst B, wherein 10% faujasite was incorporated in an amorphous silica-alumina matrix (73% $SiO_2$-27% $Al_2O_3$) was prepared by the method of this invention as follows: An acidic silica hydrosol was initially prepared by the addition of 19,760 milliliters of water glass solution, containing 6.9 weight percent $SiO_2$, to 2,338 milliliters of 25% sulfuric acid, the final pH being 4.2 at 100° F. To the resulting acidified silica hydrosol was added a homogenized faujasite prepared by the addition of 268 grams of dried faujasite including water of crystallization to one liter of water and homogenized by treatment in a blending apparatus for a period of about one minute. Gelation occurred within about 10 minutes and stirring was continued for about 20 minutes. The pH was then adjusted to 7.5 by the addition of 150 milliliters of 15% aqueous ammonia solution. After one hour of aging at the alkaline pH the pH was adjusted to 6.0 by the addition of 150 milliliters of 25% sulfuric acid. Thereafter, a solution consisting of 6,270 milliliters of aluminum sulfate solution (containing 88 grams of $Al_2O_3$/liter) and 1,540 milliliters of 28% aqueous ammonia solution, blended to prepare a pre-neutralized alum, was added and the mixture was aged at the resultant pH of 4.0 for one hour. The pH was then further adjusted to 7.0 by the addition of 1,020 milliliters of 15% aqueous ammonia solution. After 30 minutes the pH was 6.8. The product was thereafter separated from the supernatant liquid, reslurried to about 20 liters of slurry and spray dried. The spray dried product was then washed 6 times with an aqueous solution of ammonium chloride (100 grams of ammonium chloride per treatment) at a temperature of about 70° F. The product was further washed free of sulfate ions with a 2% ammonia solution. The product was thereafter soaked in a base-exchange solution comprising 51.5 milliliters of a rare earth chloride solution (57.92% rare earth chloride hexahydrate) in 1500 milliliters of water. Soaking was completed over a two hour period with occasional stirring at room temperature. The base-exchange product was then recovered, water-washed, and air dried at 400° F. and calcined at 1112° F. The catalyst was then steam deactivated as described in Example I with respect to Catalyst A. The steamed deactivated catalyst had an average bulk density of 0.52 and contained 1.64% rare earth metals.

Of the commercial cracking catalysts comprising a faujasite distributed in an amorphous silica-alumina matrix and containing rare earth metals, one was selected for comparative testing with the catalyst of this invention. Selection was on the basis of improved cracking properties with respect to other commercial catalysts tested by the method hereinafter described. The exact composition of the catalyst, hereinafter referred to as Catalyst C, has not been disclosed.

The above catalysts were individually tested and evaluated with respect to their cracking activity. As hereinbefore mentioned, the catalysts were initially steamed deactivated by passing a 60% mixture of steam and air in contact with the catalyst at a temperature of 1400° F. for a period of 2 hours. The test consisted in passing a gas oil boiling in the range of 530–995° in contact with the catalyst at substantially atmospheric pressure at a feed rate of 4 weight hourly space velocity. Initial tests were run at a temperature of 930° F. to determine conversion of the gas oil to gasoline having an end point of 410° F. Thereafter, the temperature was adjusted as required to give a 55% conversion. Each test consisted of 5 cycles and each cycle consisted of a processing period, a steam stripping period and an air regeneration period. The test results are tabulated below.

|   | Cat. A | Cat. B | Cat. C |
|---|---|---|---|
| ° F. (required for 55% conversion) | 865 | 873 | 873 |
| Gasoline, weight percent | 39.5 | 36.4 | 36.4 |
| Carbon, weight percent | 4.5 | 6.9 | 6.5 |

In addition to the catalytic cracking of hydrocarbons, catalysts prepared in accordance with the method of this invention are useful in a wide variety of hydrocarbon conversion processes involving reaction conditions comprising a temperature in the 70–1400° F. range. The catalysts are particularly useful in effecting the polymerization of olefins, particularly ethylene, propylene, 1-butene, 2-butene, isobutylene and also higher boiling olefins, at polymerization reaction conditions. The catalysts also useful in effecting the alkylation of isoparaffins with olefins or other alkylating agents including, for example, alkyl halides and the like; and also the alkylation of isobutane, isopentane, and/or isohexane with ethylene, propylene, 1-butene, etc., or mixtures thereof; and also the alkylation of aromatics with olefins or other alkylating agents, particularly the alkylation of benzene, toluene, etc., with propylene, butylene, amylenes, and higher boiling olefins including monenes, decenes, undecenes, etc., the foregoing alkylation reactions being effected at alkylation conditions disclosed in the art. The catalysts are further useful in the isomerization of paraffins, particularly n-butane, n-pentane, n-hexane, n-heptane, n-octane, etc., or mixtures thereof, including isomerization of less highly branched chain saturated hydrocarbons to more highly branched chain saturated hydrocarbons such as the isomerization of 2- or 3-methylpentane to 2,3- and 2,2-dimethylbutane; isomerization of dimethylcyclohexane to methylcyclohexane, isomerization of methylcyclopentane to cyclohexane, etc., at isomerization reaction conditions. Other hydrocarbon conversion processes including hydrocarbon transfer reactions, alkyl transfer reactions, transalkylation reactions, reforming of gasoline or naphtha to improve the anti-characteristics thereof, are effectively catalylyzed.

I claim as my invention:

1. A method of preparing a hydrocarbon conversion catalyst which comprises:
   (a) dispersing a finely divided alkali metal form of a faujasite in aqueous media and forming the mixture into a homogenized slurry,
   (b) admixing said slurry with an acidic silica hydrosol ata pH of from about 4.0 to about 4.5 and effecting gelation at a temperature of from about 70° F. to about 110° F., the amounts of slurry and hydrosol being selected so as to provide a resulting actalyst composite which contains less than about 50 weight percent of faujasite,
   (c) adjusting the pH of the resulting slurry to a pH of from about 5 to about 8 and aging the slurry for a period of from about 0.5 to about 3 hours,
   (d) treating the resulting hydrogel product with an ammonium salt solution and effecting substantially complete removal of the alkali metal content of said hydrogel product, and
   (e) washing the substantially alkali metal-free product free of soluble matter and drying the resultant catalyst composite.

2. A method of claim 1 further characterized in that step (b) comprises admixing said slurry with an acidic silice hydrosol prepared by admixing sodium silicate and aqueous sulfuric acid with a resultant pH of from about 4.2 to about 4.4, and effecting gelation at a temperature of from about 90° F. to about 100° F.

3. The method of claim 2 further characterized in that step (c) comprises adjusting the pH of said resulting slurry to a pH of from about 6 to about 7 and aging the slurry for a period of from about 0.5 to about 1.5 hours.

4. The method of claim 3 further characterized in that step (d) comprises separating and reslurrying said hydrogel product in aqueous media and treating the slurry at spray-drying conditions, treating the sprayed product with an ammonium salt solution and effecting substantially complete removal of the sodium content of the spray-dried hydrogel product.

5. The method of claim 4 further characterized in that said faujasite has a silica-alumina ratio of at least about 3.

6. The method of claim 5 further characterized in that step (d) further comprises treating the substantially alkali metal-free composite in contact with a solution comprising both rare earth metal cations and ions selected from the group consisting of hydrogen ions, hydrogen ion precursors and mixtures thereof and effecting a base exchange reaction whereby the composite contains aluminum and rare earth metals in a ratio of from about 3/1 to about 6/1.

References Cited

UNITED STATES PATENTS

| | | | |
|---|---|---|---|
| 2,462,236 | 2/1949 | Thomas | 252—451 |
| 2,834,739 | 5/1958 | Becker et al. | 252—451 X |
| 3,207,701 | 9/1965 | Curtin | 252—451 |
| 3,243,262 | 3/1966 | Carr et al. | 252—451 X |
| 3,275,571 | 9/1966 | Mattox | 252—451 |
| 3,277,018 | 10/1966 | Plank et al. | 252—451 |

DANIEL E. WYMAN, *Primary Examiner.*

C. F. DEES, *Assistant Examiner.*

U.S. Cl. X.R.

208—120; 252—451